Figure 1:
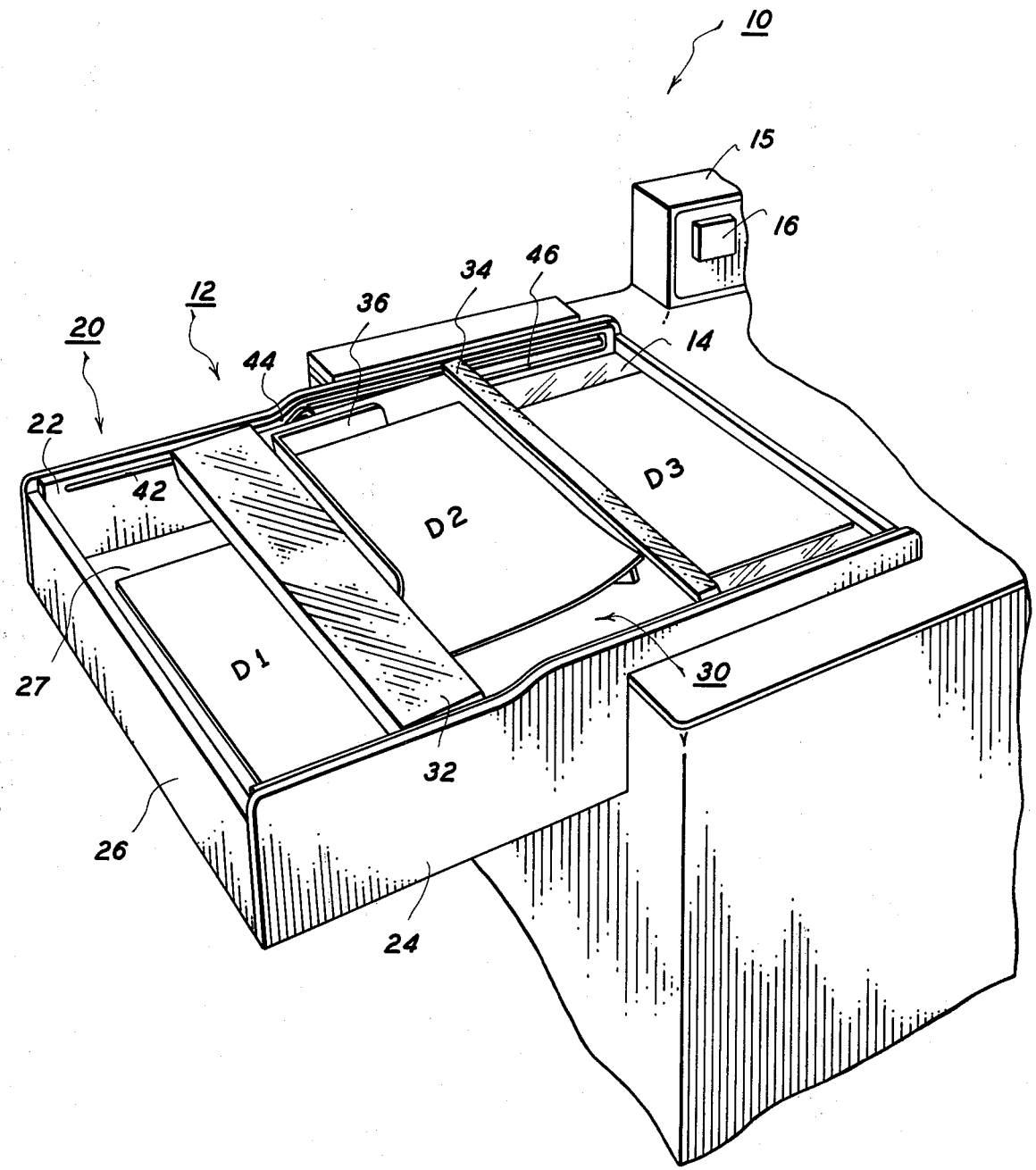

United States Patent
Robertson

[11] 3,907,277
[45] Sept. 23, 1975

[54] METHOD AND DEVICE FOR REMOVING DOCUMENTS FROM A PLATEN

[75] Inventor: Donald A. Robertson, Fairport, N.Y.

[73] Assignee: Xerox Corporation, Stamford, Conn.

[22] Filed: Aug. 26, 1974

[21] Appl. No.: 500,230

[52] U.S. Cl. .................. 271/84; 353/112; 354/180; 355/75
[51] Int. Cl. ............................................. B65h 29/46
[58] Field of Search .......... 271/84, 85, 3, 4, DIG. 9, 271/267, 63; 355/75, 76, 84, 133; 354/176, 180, 181; 353/113, 112; 214/1 BB

[56] References Cited
UNITED STATES PATENTS
477,337  6/1892  Sault.................................. 354/180
3,383,107  5/1968  Hedegaard........................ 271/84 X Primary Examiner—Richard A. Schacher
Assistant Examiner—Bruce H. Stoner, Jr.

[57] ABSTRACT

Documents to be copied are positioned on the platen of a copying machine and then removed following copying by a sliding cover which is first moved into position above the platen and then down into contact with the document on the platen and then moved in a reverse direction to frictionally carry the document which has been copied and return it to a storage tray. Upon repeating the above steps, a stack of precollated documents may be easily copied and restacked in collated order for producing sets thereof under the control of a machine operator.

3 Claims, 5 Drawing Figures

METHOD AND DEVICE FOR REMOVING DOCUMENTS FROM A PLATEN

This invention relates to a method and device for positioning precollated documents on the platen of a copier machine or the like and then removing each document after it is copied for stacking in collated fashion adjacent to the platen under control of a machine operator.

The handling of precollated documents which are to be copied on a copying machine or the like requires that each document be positioned on the platen and then removed in a collated fashion. This can be done by manually positioning each document on the platen in its prescribed sequence and removing the document for stacking in proper order so that they can be recopied another time. Obviously this is a painstaking operation since it is strictly manual and requires operator alertness at all times. An alternative to this type of operation would be a fully automatic operation in which an automatic feeding device is used to feed documents from a stack and then remove them from the platen area. Needless to say, the expense and complexity of such a device, which must be coupled by logic to the copier, is a serious concern in the operation of a simple and inexpensive copying machine. For this reason, it is desirable to have a simple and inexpensive document handling device which enables positioning of each document from a collated stack of documents onto the platen and then removed in simple manner under operator control to maximize use of the copying machine and to produce copies as economically as possible.

It is, therefore, the principle object of this invention to provide an improved document handling method and device for positioning documents from a collated stack of documents on the platen of a copying machine and then removing the documents and stacking them in collated fashion.

It is another object of the present invention to provide for a controlled positioning and removal of documents to and from the platen of a copier machine.

It is another object of the present invention to improve the stacking of uncopied documents which are to be copied and to facilitate removal of the top document from the stack onto the platen cover.

It is another object of the present invention to improve the thruput of a copier machine by facilitating the handling of documents which are to be copied under operator control.

It is still a further object of the present invention to provide a simple and inexpensive device for the handling of documents which are to be copied in collated fashion to produce sets thereof.

These and other objects of the invention will become more apparent from the detailed explanation of the following description to be read with the accompanying drawings in which:

FIG. 1 is a perspective view of an electrostatographic copying machine having an improved document handling device according to the present invention; and FIGS. 2a through 2d illustrate the operation of the improved document handling device sequentially.

Referring now to FIG. 1, there is shown a typical electrostatographic copying machine generally designated 10 which has an improved document handling device 12 positioned adjacent to the platen 14 on which are positioned documents to be reproduced as will be more fully understood hereinafter. The copier machine 10 has a control panel 15 including a START PRINT button 16 which, when pressed, causes each of the documents to be copied by the copier processing stations in a manner well known by those skilled in the art.

The improved document handling device 12 includes a frame 20 having contiguous side wall members 22 and 24 end wall member 26 and bottom wall member 27. Supported on the frame 20 is a cover member 30 disposed including bracket members 32 and 34 between which is situated a tray 36 for receiving a stack of documents to be copied.

Each of the wall members 22 and 24 are formed with a slot 42 which extends first in a linear direction towards platen 14 and then bifurcates into a path 44 which curves upwardly above platen 14 and then linearly and drops vertically downward towards platen 14 and a second path 46 which extends in a linear direction as a direct extension of the slot 42 and is joined to the path 44.

Figure 2A:
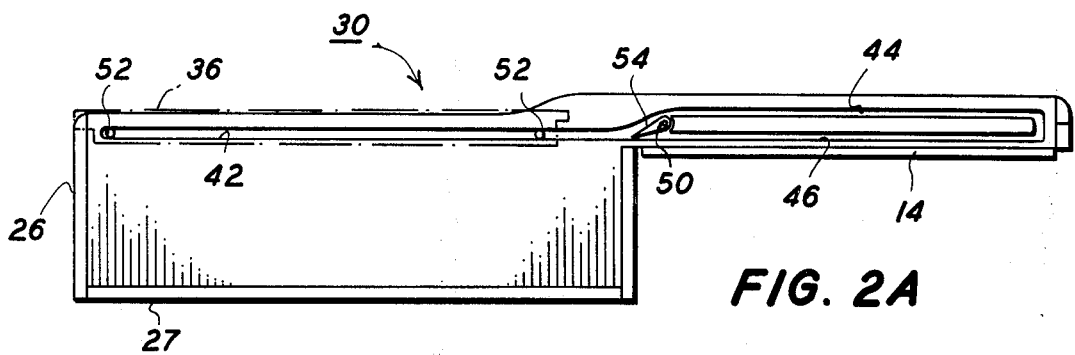
Figure 2B:
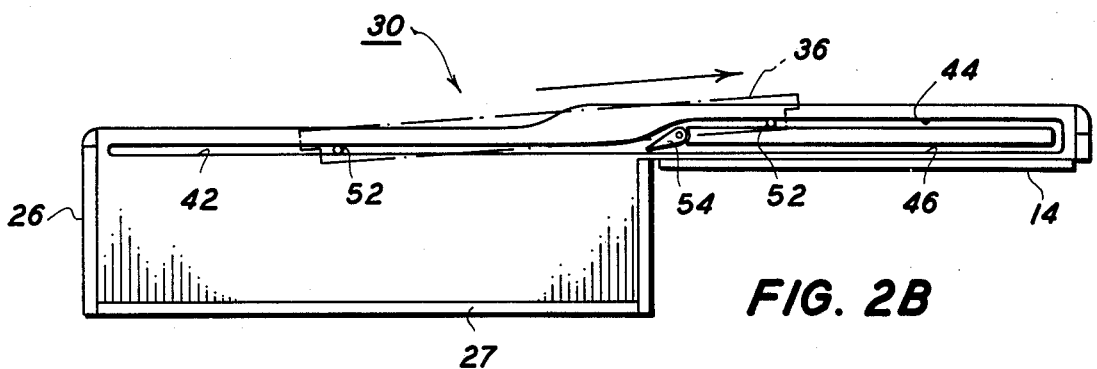
Figure 2C:
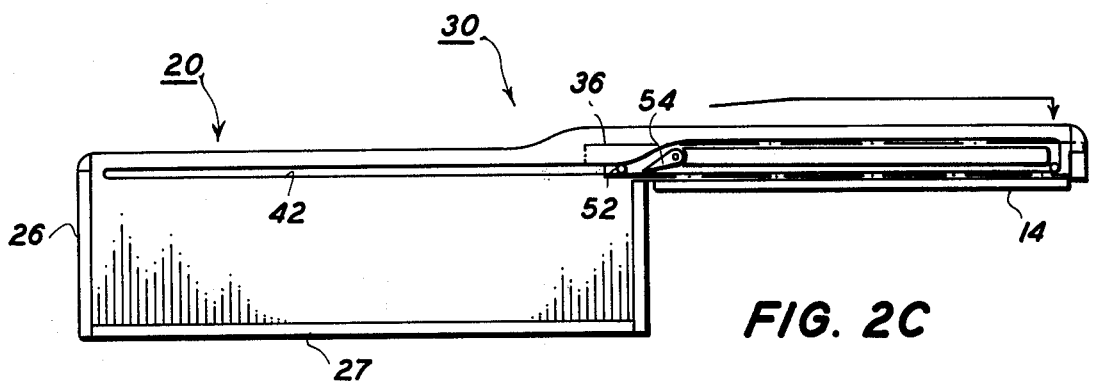
Figure 2D:
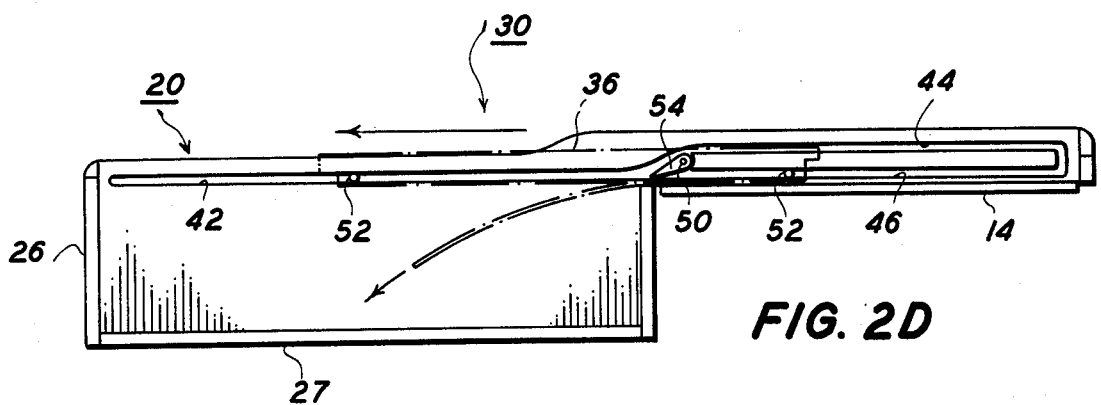

Cover member 30 supports the stack of documents to be copied in tray 36 and moves in sliding relationship by means of pins 52 carried in slots 42. The operation of the document handling apparatus is best understood in conjunction with FIGS. 2a through 2d. In FIG. 2a cover member 30 is in the off platen position for copying the first document which is resting in the tray 36. This document is removed manually by the machine operator and placed on the platen 14. The cover member 30 is then moved in sliding relationship along the path of slot 42 to the right looking at the Figures as shown in FIG. 2b whereupon the cover member 30 is directed upwardly over the platen area due to a pivotable ramp member 54 which contacts pin members 52 carried by the cover member 30. Upon depressing START PRINT button 16, the document is copied. It will be appreciated that at the furthest extent of its travel to the right looking at the Figures due to the path 44 of the slot 42, cover member 30 is in contact with the document as best shown in FIG. 2c. Upon sliding the cover member in a reverse direction or to the left looking at the Figures, the document, which has been copied, due to friction of the cover member, is removed from the platen 14 and deposited into a receiving tray formed by the bottom wall 27 of the frame 20.

In FIG. 1, D1 represents the first document which has been copied and D2 represents the second document which is on the platen 14 and D3 represents the third document which is to be copied following second document. It will be appreciated that by positioning each document over the platen from the tray 36 and then sliding the cover member 30 in overlying relationship and then into contact with the document on the platen, that each document which has been previously copied is returned to the tray 27 in collated order and ready to be recopied to produce collated sets of the document information.

It will now be appreciated that the improved document handling apparatus is a semi-automatic device which provides improved document handling and thruput. Further, the removal from the platen of documents which are to be copied in collated order is accomplished simply and quickly. Thus, the invention provides a controlled positioning and removal of the documents to and from the platen and enables improved thruput of the copier machine while minimizing operator inconvenience.

What is claimed is:

1. In an electrostatic copying machine in which precollated documents are to be copied and then removed from a platen and stacked, an improved document handling device comprising:

a frame;

a cover member positioned on said frame for holding a stack of documents to be copied, said cover member being adapted for sliding movement on said frame across the platen, said frame being formed with parallel slots contiguous to the platen, said slots extending in a linear path and then bifurcating with a first path which curves upwardly above the platen then linearly across the platen and then downwardly towards the platen and with a second path extending linearly and joining to the first path, said cover member having a plurality of pin members received in said slots whereby upon sliding said cover member in a first direction it moves upwardly above the platen and then downwardly towards the platen contacting a document thereon and upon moving in a reverse direction removes the document from the platen after copying thereof and slides it into a receiving tray on the frame.

2. A device according to claim 1 including a pivotable ramp member is positioned adjacent to the platen to cause a cover member to follow said first path upon sliding in a direction towards the platen.

3. A method of copying documents on a copying machine wherein precollated documents are copied from a stack and then removed from the platen and restacked in collated fashion comprising the steps of positioning a stack of documents on a sliding cover adjacent to the platen, removing a first document to be copied and placing it on the platen, sliding the cover over the platen such that the bottom of the cover comes into contact with the document, copying the document, sliding the cover in a reverse direction carrying the document which has been copied with it and depositing it to a stacking area, placing the next document on the top of the platen area and repeating the before mentioned steps until all the documents have been copied.

* * * * *